(12) United States Patent
Haines et al.

(10) Patent No.: US 8,352,750 B2
(45) Date of Patent: Jan. 8, 2013

(54) ENCRYPTION BASED STORAGE LOCK

(75) Inventors: Matthew D. Haines, Ft. Collins, CO (US); Daniel Thero, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 12/863,497

(22) PCT Filed: Jan. 30, 2008

(86) PCT No.: PCT/US2008/052402
§ 371 (c)(1),
(2), (4) Date: Jul. 19, 2010

(87) PCT Pub. No.: WO2009/096955
PCT Pub. Date: Aug. 6, 2009

(65) Prior Publication Data
US 2010/0299539 A1     Nov. 25, 2010

(51) Int. Cl.
*H04L 29/06* (2006.01)
(52) U.S. Cl. .................................................. 713/193
(58) Field of Classification Search ............... 713/193
See application file for complete search history.

(56) References Cited

U.S. PATENT DOCUMENTS

| | | | |
|---|---|---|---|
| 7,146,499 B2 * | 12/2006 | Yellepeddy ................ | 713/165 |
| 7,206,939 B2 * | 4/2007 | Miyazaki et al. ........... | 713/193 |
| 7,895,450 B2 * | 2/2011 | Watanabe .................. | 713/193 |
| 2004/0172538 A1 * | 9/2004 | Satoh et al. ................ | 713/175 |
| 2005/0013441 A1 * | 1/2005 | Klein ........................... | 380/278 |
| 2006/0015946 A1 * | 1/2006 | Yagawa ....................... | 726/32 |
| 2006/0021064 A1 * | 1/2006 | England et al. ............ | 726/27 |
| 2006/0063527 A1 * | 3/2006 | Ito ............................... | 455/426.2 |
| 2006/0136735 A1 * | 6/2006 | Plotkin et al. ............. | 713/182 |
| 2007/0174456 A1 * | 7/2007 | Yellepeddy ................ | 709/225 |
| 2007/0234037 A1 * | 10/2007 | Toda ........................... | 713/155 |
| 2008/0016373 A1 * | 1/2008 | Yagawa ...................... | 713/189 |
| 2008/0059795 A1 * | 3/2008 | Vogel ......................... | 713/165 |
| 2008/0219449 A1 * | 9/2008 | Ball et al. ................... | 380/277 |
| 2008/0219453 A1 * | 9/2008 | Chang et al. .............. | 380/286 |
| 2008/0232592 A1 * | 9/2008 | Lee et al. ................... | 380/277 |
| 2009/0031143 A1 * | 1/2009 | Hodzic ...................... | 713/193 |
| 2009/0034733 A1 * | 2/2009 | Raman et al. ............. | 380/277 |

(Continued)

FOREIGN PATENT DOCUMENTS

WO    2006124479    11/2006

OTHER PUBLICATIONS

Written Opinion of the International Searching Authority. Date of Mailing Jan. 30, 2009. International Application No. PCT/US2008/052402. Filing Date Jan. 30, 2008.

(Continued)

*Primary Examiner* — David García Cervetti (57) ABSTRACT

In one embodiment an encryption based storage lock comprises at least one storage media, at least one processor, at least one drive controller, and logic to; store at least a first encryption key in a persistent memory location, establish a logical association between the first encryption key and a first drive, receive a write operation in a drive controller, wherein the write operation is associated with the first drive in the network attached storage device, encrypt data associated with the write operation using the first encryption key, and store the encrypted data in the first drive in the network attached storage device.

19 Claims, 4 Drawing Sheets

U.S. PATENT DOCUMENTS

| | | | |
|---|---|---|---|
| 2009/0063847 A1* | 3/2009 | Haynes et al. | 713/150 |
| 2009/0106561 A1* | 4/2009 | Ejiri | 713/193 |
| 2009/0164513 A1* | 6/2009 | Astigarraga et al. | 707/104.1 |
| 2009/0164804 A1* | 6/2009 | Mardiks et al. | 713/193 |
| 2009/0187770 A1* | 7/2009 | Cao et al. | 713/193 |
| 2009/0296926 A1* | 12/2009 | Perlman | 380/44 |
| 2010/0125730 A1* | 5/2010 | Dodgson et al. | 713/153 |
| 2010/0162002 A1* | 6/2010 | Dodgson et al. | 713/193 |
| 2010/0174684 A1* | 7/2010 | Schwaab et al. | 707/655 |
| 2010/0185843 A1* | 7/2010 | Olarig et al. | 713/2 |
| 2011/0126023 A1* | 5/2011 | Wang et al. | 713/182 |

OTHER PUBLICATIONS

International Preliminary Report of Patentability. Date of Issuance Aug. 30, 2010. International Application No. PCT/US2008/052402. Filing Date Jan. 30, 2008.

* cited by examiner

ENCRYPTION BASED STORAGE LOCK

BACKGROUND

The term Network Attached Storage (NAS) refers to a dedicated data storage device(s) connected directly to a computer network to provide centralized data access and storage services to one or more network clients such as, e.g., a personal computer. In some circumstances it may be useful to lock one or more storage media to a specific NAS device.

DETAILED DESCRIPTION

Described herein are exemplary systems and methods to implement an encryption-based storage lock in an network attached storage device. The methods described herein may be embodied as logic instructions stored on a computer-readable medium. When executed on a processor, the logic instructions cause a general processor to be programmed as a special-purpose machine that implements the described methods. The processor, when configured by the logic instructions to execute the methods recited herein, constitutes structure for performing the described methods.

Figure 1:
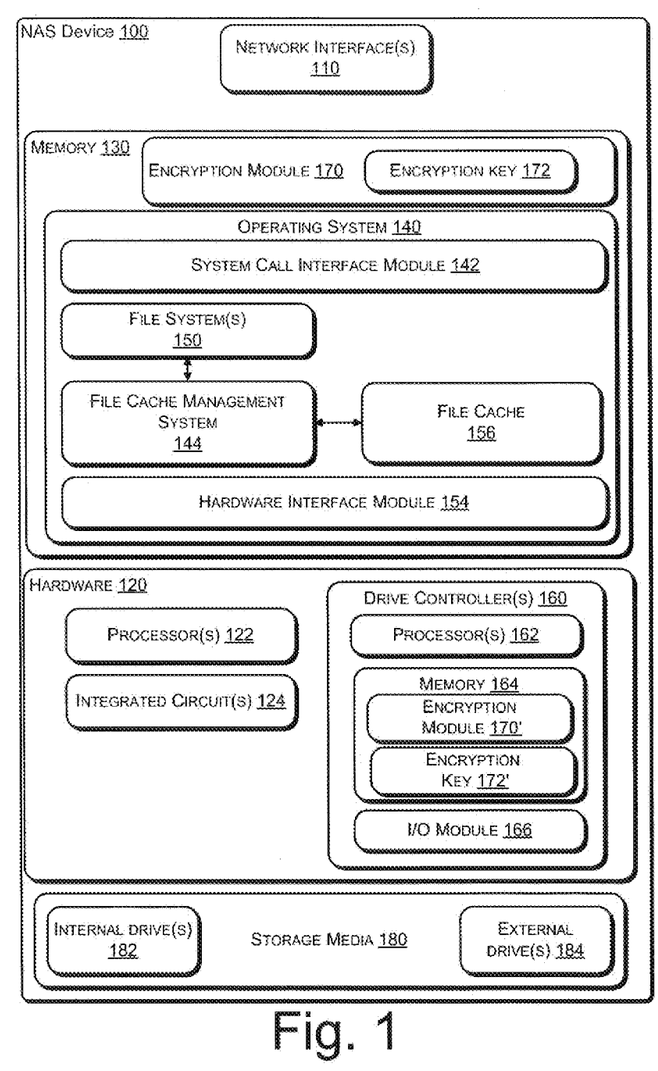
FIG. 1 is a schematic illustration of an exemplary network attached storage device with an encryption lock.

FIG. 1 is a schematic illustration of one embodiment of a network attached storage (NAS) device 100. Referring to FIG. 1, network storage device 100 comprises one or more network interfaces 110 which enable a communication connection with a network.

Network interface 110 may comprise an input/output (I/O) port to provide a physical connection with a network. For example, network interface 110 may comprise an Ethernet port. Network interface 110 may comprise a network interface card (NIC), also commonly referred to as a network adapter or a network card. The NIC manages I/O operations to enable NAS device 100 to communicate over a network. Alternatively, the operations of the NIC may be implemented on a main circuit board such as, e.g., a motherboard of NAS device 200.

NAS device further comprises at hardware 120. The hardware 120 may comprises at least one integrated circuit 124 and in practice typically comprises a plurality of integrated circuits 124. In some embodiments, the hardware 120 may comprise at least one processor 122. In some embodiments, a digital adapter may include a plurality of processors 122. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

In some embodiments, hardware 120 may comprise a drive controller 160. In some embodiments, a drive controller 160 may be a circuit which allows for communication with storage media such as a hard disk, floppy disk or the like. In some embodiments a drive controller 160 may comprise; one or more processors 162, memory 164, an encryption module 170' and encryption key 172' and an input/output module 166. In some embodiments, an input/output module 166 may comprise physical input output ports and logic that controls these input and output ports.

In operation, a drive controller 160 may receive, from a computing device on a network, input/output operations which write data to storage media 180 and transmit that data to one or more storage media 180. In addition, drive controller may receive input/output operations which read data from storage media 180. In some embodiments, a first encryption key 172' may be stored in a memory 164, and the encryption module 170' uses the encryption key to encrypt data written to and to decrypt data read from the storage media 180. In addition, the encryption module 170' may further comprise logic to detect the removal of the drive controller 160 from the network attached storage device 100, and in response to the removal, disable the first encryption key 172'.

In some embodiments, encryption modules 170, 170' and encryption keys 172, 172' may be found in the NAS device hardware 120 and/or memory 130. In some embodiments, a NAS device may include an encryption module 170 in the NAS device which may generate an encryption key 172 for each drive and logically associate the encryption key 172 with the drive. In some embodiments, a drive vendor may generate an encryption key for each drive and store the encryption key in a predetermined memory location, on the drive. In such embodiments, when a drive is plugged into the NAS device, the NAS device may retrieve the encryption key and stores it in a memory location such as ROM, and then may destroy the encryption key on the drive.

In some embodiments, a first encryption key may be stored in a read-only memory (ROM) module in the network attached storage device. The NAS device, alone or in combination with the ROM may implement a procedure in which at least a portion of the ROM is disabled when the ROM is removed from the NAS device. For example, NAS device 100 further comprises system random access memory and/or read-only memory, and the encryption key 172 is stored in a portion of the read-only memory. In one embodiment, if the NAS device ROM is removed from the NAS Device, a voltage sufficient to render inoperable the portion of the ROM in which the encryption key is stored is automatically applied thereby destroying the encryption key.

Memory 130 may comprise an operating system 140 for managing operations of NAS device 100. In one embodiment, operating system 140 comprises a hardware interface module 154 that provides an interface to system hardware. The particular embodiment of operating system 140 is not critical to the subject matter described herein. Operating system 140 may be embodied as a UNIX operating system or any derivative thereof (e.g., Linux, Solaris, etc.) or as a Windows® brand operating system.

Operating system 140 comprises (or interfaces with) a file system(s) 150 that manages files used in the operation of NAS device 100. For example, file system(s) 150 may implement one or more of a Network File System (NFS) protocol, a Common Internet File System (CIFS) protocol, or the like. In one embodiment operating system 140 may comprise a file cache management system 144 interposed logically between the file system(s) 150 and underlying modules such as, e.g., the hardware interface module 154. File cache management system 144 interfaces with the file system(s) 150 to manage the file cache 156 as a resource that may be shared between users of the computer system, e.g., on a per-workload basis.

Operating system 140 further comprises a system call interface module 142 that provides an interface between the operating system 140 and one or more application modules that execute on NAS device 100.

NAS device 100 further comprises storage media 180. For example, storage media 180 may be embodied as one or more arrays of magnetic disk drives. Alternatively, storage media 180 may comprise optical, magneto-optical, or electro-optical storage media. Storage media 180 may be configured to implement RAID redundancy. In some embodiments, storage media 180 may comprise at least one internal drive 182 or external drive 184. By way of example, and not limitation, an external drive 184 may comprise a flash memory drive, a diskette drive or the like.

NAS device 100 further comprises an encryption module 170. In some embodiments, an encryption module 170 is embodied in a NAS device memory 130. In some embodiments, an encryption module 170 is embodied in a NAS device hardware 120. In some embodiments, each encryption module 170 has a NAS device 100 specific encryption key 172. In operation, an encryption key 172 may lock data stored on attached storage media 180 to the specific NAS device 100. In some embodiments, an encryption module encrypts all data transmitted through a drive controller 160 with a NAS device specific encryption key 172. By way of example and not limitation, an encryption module 170 may use encryption protocols, such as, but not limited to, RSA encryption, or the like to encrypt data stored on a NAS device.

In some embodiments, a NAS device may contain an encryption key 172. By way of example and not limitation, an encryption key may use 128-bit, 256-bit or the like encryption. In some embodiments, a record of each NAS device encryption key 172 may be kept with an escrow service so as to allow a user to later retrieve the encryption key if needed. In operation, if a storage media is removed from a NAS device, access to the data on that storage media is locked to the NAS device through the use of an encryption module 170 with a NAS specific encryption key 172.

In operation, if a storage media has been removed from a NAS device and anyone attempts to read any of the stored data, the data may be unreadable because the encryption key has locked the data to the specific NAS device. In operation, an encryption based drive lock may provide secure data protection while allowing for normal insertion and removal of drives within a specific NAS device.

Figure 2A:
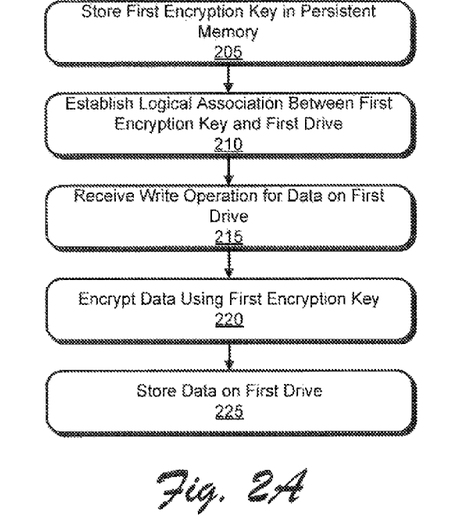
FIG. 2A is a flowchart illustrating operations in one embodiment of an encryption lock in a network attached storage device.

FIG. 2A is, a flowchart illustrating operations in one embodiment of an encryption lock in an network attached storage device. In some embodiments, the operations depicted in FIG. 2A are implemented by the encryption module 170 and/or 170'.

Referring to FIG. 2, at operation 205, a NAS device may store at least a first encryption key in a persistent memory location. In some embodiments, storing at least a first encryption key in a persistent memory location in a network attached storage device may comprise storing the encryption key in a read-only memory module in a drive controller in the network attached storage device. At operation 210, a NAS device may establish at least one logical association between a first encryption key and a first drive. At operation 215, a NAS device may receive a write operation for data on a first drive. By way of example and not limitation, the write operation may originate from over a network, from a direct link between a computing device and a NAS device or the like. In some embodiments, a computing device may initiate a write operation without user input, such as but not limited to, when a computing device is performing a preprogrammed backup procedure or the like.

At operation 220, a NAS device may encrypt data using a first encryption key. By way of example and not limitation, an encryption key may use 128-bit, 256-bit or the like encryption.

At operation 225, a NAS device may store data on a first drive. In some embodiments, storage media may be internal or external drives. By way of example and not limitation, internal drives may include a hard disk drive, nonvolatile memory or the like. By way of example and not limitation, external drives may include thumb drives, handy drives, memory sticks, flash sticks, jump drives or the like.

In some embodiments, a NAS device may further comprise; storing at least a second encryption key in a persistent memory location in a network attached storage device, establishing a logical association between the second encryption key and a second drive in the network attached storage device, receiving a write operation in a drive controller in the network attached storage device, wherein the write operation is associated with the second drive in the network attached storage device, encrypting data associated with the write operation using the second encryption key, and storing, in a network attached storage device, the encrypted data in the second drive in the network attached storage device.

Figure 2B:
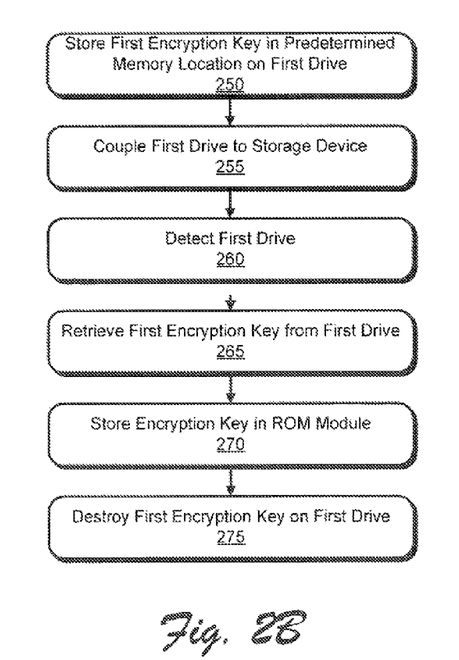
FIG. 2B is a flowchart illustrating operations in one embodiment of an encryption lock in a network attached storage device.

FIG. 2B is a flowchart illustrating operations in one embodiment of an encryption lock in an network attached storage device. In some embodiments, the operations depicted in FIG. 2B are implemented by the encryption module 170 and/or 170'.

Referring to FIG. 2B, at operation 250 a first encryption key may be stored in a predetermined memory location associated: with a first storage media. In some embodiments, a vendor may generate an encryption key for each drive and store the encryption key in a predetermined memory location on the drive. In such embodiments, when a drive is plugged into the NAS device, the NAS device may retrieve the encryption key and stores it in a memory location such as ROM, and then may destroy the encryption key on the drive.

At operation 255, a NAS device may couple a first storage media to a NAS device. In some embodiments, storage media may be internal or external drives. By way of example and not limitation, internal drives may include a hard disk drive, nonvolatile memory or the like. By way of example and not limitation, external drives may include thumb drives, handy drives, memory sticks, flash sticks, jump drives or the like.

At operation 260, a NAS device detects a first drive. In some embodiments, this detection process may occur during the boot phase of a NAS device.

At operation 265, a NAS device may retrieve a first encryption key from the first drive. At operation 270 a NAS device may store an encryption key in a ROM module. In some embodiments, a NAS device may store an encryption key in memory within a drive controller.

At operation 275 a NAS device may destroy a first encryption key on a first drive. In operation, destruction of the first drive encryption key may lock the first drive to the NAS device in that the data stored on the first drive may only be readable through the specific NAS device.

Figure 3:
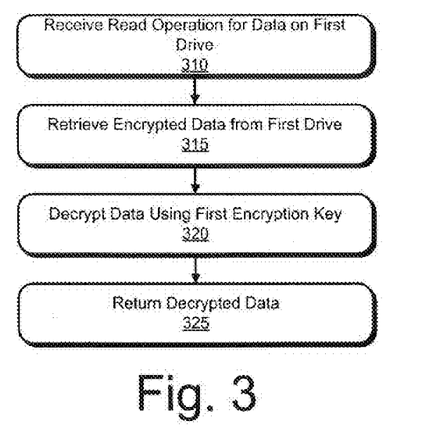
FIG. 3 is a flowchart illustrating operations in one embodiment of an encryption lock in a network attached storage device.

FIG. 3 is a flowchart illustrating operations in one embodiment of a encryption lock in an network attached storage device. In some embodiments, the operations depicted in FIG. 3 are implemented by the encryption module 170 and/or 170'.

Referring to FIG. 3, at operation 310 a NAS device may receive a read operation for data on a first drive. In some embodiments, this read request may be made over a network, by a direct connection between a computing device and a NAs device or the like.

At operation 315, a NAS device may retrieve encrypted data from a first drive. At operation 320, a NAS device mat decrypt data using a first encryption key. In some embodiments, an encryption key may be stored in a NAS device Rom memory. In some embodiments, an encryption key may be stored in a NAS device drive controller memory.

At operation 325, a NAS device returns the decrypted data. In some embodiments, the decrypted data may be transmitted over a network to a users computing device.

Figure 4:
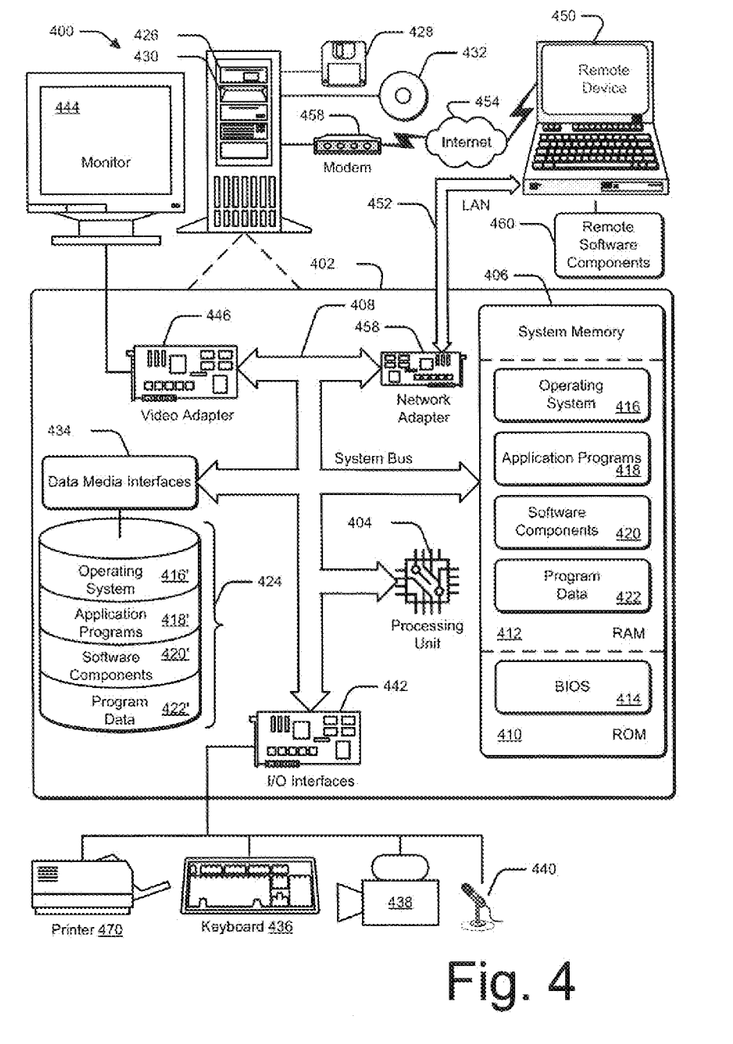
FIG. 4 is a schematic illustration of a computing environment, according to some embodiments.

In some embodiments, an encryption-based hard drive lock may also be implemented in a computing environment. FIG. 4 is a schematic illustration of one embodiment of a computing environment. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 404, a system memory 406, and a system bus 408 that couples various system components including the system memory 406 to the processing unit 404. The system bus 408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus, and PCI Express (PCIE).

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 406 includes computer storage media in the form of volatile and/or nonvolatile memory such as read only memory (ROM) 410 and random access memory (RAM) 412. A basic input/output system 414 (BIOS), containing the basic routines that help to transfer information between elements within computer 400, such as during start-up, is typically stored in ROM 410. RAM 412 typically contains data and/or program modules that are immediately accessible to and/or presently being operated on by processing unit 404. By way of example, and not limitation, FIG. 4 illustrates operating system 416, application programs 418, other software components 420, and program data 422.

The computer 400 may also include other removable/non-removable, volatile/nonvolatile computer storage media. By way of example only, the computer system of FIG. 4 may include a hard disk drive 424 that reads from or writes to non-removable, nonvolatile magnetic media, a magnetic disk drive 426 that reads from or writes to a removable, nonvolatile magnetic disk 428, and an optical disk drive 430 that reads from or writes to a removable, nonvolatile optical disk 432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 424 is typically connected to the system bus 408 through a non-removable memory interface such as data media interface 434, and magnetic disk drive 426 and optical disk drive 430 are typically connected to the system bus 408 by a removable memory interface.

The drives and their associated computer storage media discussed above and illustrated in FIG. 4 provide storage of computer-readable instructions, data structures, program modules, and other data for computer 400. In FIG. 4, for example, hard disk drive 424 is illustrated as storing operating system 416', application programs 418', software components 420', and program data 422'. Note that these components can either be the same as or different from operating system 416, application programs 418, software components 420, and program data 422. Operating system 416, application programs 418, other program modules 420, and program data 422 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone 440, joystick, game pad, satellite dish, scanner, or the like. These and other input devices are often connected to the processing unit 404 through an input/output (I/O) interface 442 that is coupled to the system bus, but may be connected by other interface and bus structures, such as a parallel port, game port, or a universal serial bus (USB). A monitor 444 or other type of display device is also connected to the system bus 406 via an interface, such as a video adapter 446. In addition to the monitor 444, computers may also include other peripheral output devices (e.g., speakers) and one or more printers 470, which may be connected through the I/O interface 442.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 442, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is comprised in at least an implementation. The appearances of the phrase "in one embodiment" in various places in the specification are not necessarily all referring to the same embodiment.

What is claimed is:

1. A method, comprising:
   detecting, at a network attached storage device, first storage media, wherein the first storage media comprises a first encryption key in a memory location associated with the first storage media;
   retrieving, by the network attached storage device, the first encryption key from the memory location associated with the first storage media;
   storing, by the network attached storage device, the first encryption key in a persistent memory location in a network attached storage device;

causing, by the network attached storage device, the first encryption key on the first storage media to be destroyed;

establishing, by the network attached storage device, a logical association between the first encryption key and a first storage media;

receiving a write operation in a drive controller associated with the network attached storage device, wherein the write operation is associated with the first storage media;

encrypting data associated with the write operation using the first encryption key; and storing, in a network attached storage device, the encrypted data in the first drive storage media in the network attached storage device.

2. The method of claim 1, wherein the detection occurs during a boot phase of the network attached storage device.

3. The method of claim 1, wherein storing the first encryption key in the persistent memory location in the network attached storage device comprises storing the encryption key in a read-only memory module in a drive controller in the network attached storage device.

4. The method of claim 1, wherein encrypting the data associated with the write operation using the first encryption key comprises:

providing the encryption key from the persistent memory location into an active memory location; and processing, in the network attached storage device, the data associated with the write operation through an encryption module.

5. The method of claim 1, further comprising:

receiving a read operation in the drive controller associated with the network attached storage device, wherein the read operation requests data from the first storage media;

retrieving, from the first drive, the data associated with the read operation;

decrypting the data associated with the read operation using the first encryption key; and returning the data in response to the read operation.

6. The method of claim 1, further comprising:

detecting, at a network attached storage device, a second storage media, wherein the second storage media comprises a second encryption key in a memory location associated with the second storage media;

retrieving, by the network attached storage device, the second encryption key from the memory location associated with the second storage media;

storing, the network attached storage device, the second encryption key in a persistent memory location in the network attached storage device;

causing, by the network attached storage device, the second encryption key on the second storage media to be destroyed;

establishing a logical association between the second encryption key and a second storage media;

receiving a write operation in the drive controller associated with the network attached storage device, wherein the write operation is associated with the second storage media;

encrypting data associated with the write operation using the second encryption key; and storing, in a network attached storage device, the encrypted data in the second drive storage media in the network attached storage device.

7. The method of claim 1, wherein the first encryption key is stored in a read-only memory module in the network attached storage device, and further comprising:

detecting removal of the read-only memory module from the network attached storage device; and in response to the removal, disabling the first encryption key on the read-only memory module.

8. The method of claim 1, wherein the first encryption key is stored in a memory module on a drive controller in the network attached storage device, and further comprising:

detecting removal of the drive controller from the network attached storage device; and in response to the removal, disabling the first encryption key on the read-only memory module.

9. A network attached storage device comprising:

a drive controller;

a memory module; and logic to:

detect, at the network attached storage device, a first storage media, wherein the first storage media comprises the first encryption key in a memory location associated with the first storage media;

retrieve, by the network attached storage device, the first encryption key from the memory location associated with the first storage media;

store a first encryption key in the memory module in the network attached storage device;

cause, by the network attached storage device, the first encryption key on the first storage media to be destroyed establish a logical association between the first encryption key and the first storage media associated with the network attached storage device;

receive a write operation in the drive controller associated with the network attached storage device, wherein the write operation is associated with the first storage media;

encrypt data associated with the write operation using the first encryption key; and store, in the network attached storage device, the encrypted data in the first storage media drive in the network attached storage device.

10. The network attached storage device of claim 9, further comprising logic to:

detect removal of the memory module from the network attached storage device; and in response to the removal, disable the first encryption key on the memory module.

11. The network attached storage device of claim 9, wherein the memory module comprises a read-only memory module.

12. The network attached storage device of claim 9, further comprising logic to:

provide the encryption key from the memory module to an active memory location; and process, in a network attached storage device, data associated with the write operation through an encryption module.

13. The network attached storage device of claim 9, further comprising logic to:

receive a read operation in the drive controller in the network attached storage device, wherein the read operation requests data associated with the first storage media;

retrieve, from the first storage media, data associated with the read operation;

decrypt the retrieved data associated with the read operation using the first encryption key; and return the data in response to the read operation.

14. The network attached storage device of claim 9, further comprising logic to:
- store a second encryption key in the memory module in the network attached storage device;
- establish a logical association between the second encryption key and a second storage media;
- receive a write operation in the drive controller associated with the network attached storage device, wherein the write operation is associated with the second storage media;
- encrypt data associated with the write operation using the second encryption key; and
- store, in a network attached storage device, the encrypted data in the second drive storage media in the network attached storage device.

15. The network attached storage device of claim 9, further comprising logic to detect the first storage media during a boot phase of the network attached storage device.

16. A non-transitory computer readable medium comprising instructions which, when executed, cause a network attached storage device to:
- detect a first storage media, wherein the first storage media comprises a first encryption key in a memory location associated with the first storage media;
- retrieve the first encryption key from the memory location associated with the first storage media;
- store the first encryption key in a memory module;
- cause the first encryption key on the first storage media to be destroyed;
- receive a write operation, wherein the write operation is associated with the first storage media;
- encrypt data associated with the write operation using the first encryption key; and
- store the encrypted data in the first storage media.

17. The non-transitory computer readable medium of claim 16, comprising further instructions which, when executed, cause the network attached storage device to:
- detect removal of the memory module; and
- in response to the removal, disable the first encryption key on the memory module.

18. The non-transitory computer readable medium of claim 16, wherein the first storage media is detected during a boot phase of the device.

19. The non-transitory computer readable medium of claim 16, wherein the memory module comprises a read-only memory module.

* * * * *

UNITED STATES PATENT AND TRADEMARK OFFICE
CERTIFICATE OF CORRECTION

| | |
|---|---|
| PATENT NO. | : 8,352,750 B2 |
| APPLICATION NO. | : 12/863497 |
| DATED | : January 8, 2013 |
| INVENTOR(S) | : Matthew D. Haines et al. |

It is certified that error appears in the above-identified patent and that said Letters Patent is hereby corrected as shown below:

In the Claims

In column 8, line 58, in Claim 1, after "device," insert -- a --.

In column 9, line 48, in Claim 6, after "storing," insert -- by --.

Signed and Sealed this
Fourteenth Day of May, 2013

Teresa Stanek Rea
*Acting Director of the United States Patent and Trademark Office*